United States Patent [19]

Bos

[11] 3,786,328

[45] Jan. 15, 1974

[54] SWITCHING CIRCUIT FOR CONTROLLING ALTERNATING CIRCUIT FLOW

[75] Inventor: Isaac Bos, Wattwil, Switzerland

[73] Assignee: Heberlein & Co. AG, Wattwil, Switzerland

[22] Filed: Sept. 15, 1972

[21] Appl. No.: 289,538

[30] Foreign Application Priority Data

Sept. 16, 1971 Switzerland ........................ 13563/71

[52] U.S. Cl. .............. 318/227, 318/345, 307/252 B

[51] Int. Cl. .............................................. H02p 5/40

[58] Field of Search .................... 307/252 B, 282 N, 307/252 T; 318/227, 345

[56] References Cited

UNITED STATES PATENTS 3,353,078 11/1967 Maynard ............................ 318/227
3,495,098 2/1970 Albrecht ......................... 307/252 B
3,470,436 9/1969 Steele ................................ 318/227
3,443,188 5/1969 Mortimer ........................ 307/252 B
3,486,042 12/1969 Watrous .......................... 307/252 B

*Primary Examiner*—Gene Z. Rubinson
*Attorney*—Joseph M. Fitzpatrick et al.

[57] ABSTRACT

Disclosed herein is a control circuit including an automatically controlled switch coupled in series with a load and an alternating current source, wherein the switch regulates current flow in both directions of flow from the source. A triggering circuit is coupled to a control electrode of the switch for actuating the switch to permit current flow during equal energy portions of both the positive and negative half-waves of the source voltage.

9 Claims, 9 Drawing Figures

SWITCHING CIRCUIT FOR CONTROLLING ALTERNATING CIRCUIT FLOW

BACKGROUND OF THE DISCLOSURE

This invention pertains to an automatically controlled switching device connected in series with a load and an alternating current source for controlling the amount of energy supplied to the load. In the prior art, it has been common to utilize devices such as silicon-controlled rectifiers (SCR's) or thyratrons for the automatic switching device, but such devices conduct current in only one direction, thereby limiting their usefulness in some instances. For example, it is often desirable to apply a portion of each half-wave of the alternating current source to the load, and in such situations it is necessary to use two SCR's in parallel, or two thyratrons in parallel, together with separate triggering circuits for each device. Furthermore, in such a parallel configuration it is necessary to accurately balance the triggering level of each device, so that the desired circuit operation becomes difficult to achieve.

Thus, an object of this invention is to provide a single automatic switch device, having a single trigger circuit, for allowing current flow during both the positive and negative phases of the source voltage; and, particularly, a triggering circuit for such a device wherein it is possible to simultaneously control the triggering points for both the positive and negative half-waves of the source voltage.

SUMMARY OF THE INVENTION

In accordance with the invention, there is provided an automatic switching device which permits bi-directional current flow, wherein the switching device is connected in series with a load and an alternating current source. A triggering control circuit is connected to a control electrode of the automatic switching device, and the triggering circuit automatically produces pulses which are timed to cause the switch to provide equal conduction periods during both the positive and nagative half-waves of the source voltage.

In one embodiment a timing circuit consists of an RC combination, and the charging and discharging current supplied to the capacitor of the RC combination is coupled through a pair of parallel connected diodes disposed in an opposite polarity relationship, and having one of the diodes biased in a reverse direction. The positive and negative voltage swings applied to the capacitor are sensed by a bi-directional trigger device and applied to the automatic switch to bring the latter to conduction. The above described circuit operates to provide equal conduction periods during both the positive and negative half-waves of the source voltage, and the duration of such conduction periods can be controlled by varying the above mentioned reverse bias applied to one of the parallel connected diodes.

The reverse bias circuit for the diode can take various forms including a battery, a transistor-capacitor source, or a feedback circuit from the load. For example, one application for the circuit is to connect the automatic switch in series with a motor and an alternating current source and to sense the speed or energy applied to the motor, while using this sensed parameter to control the biasing voltage.

BRIEF DESCRIPTION OF THE DRAWINGS

The accompanying drawings illustrate various concepts of the invention. In such drawings.

DETAILED DESCRIPTION OF THE PREFERRED EMBODIMENT

Figure 1:
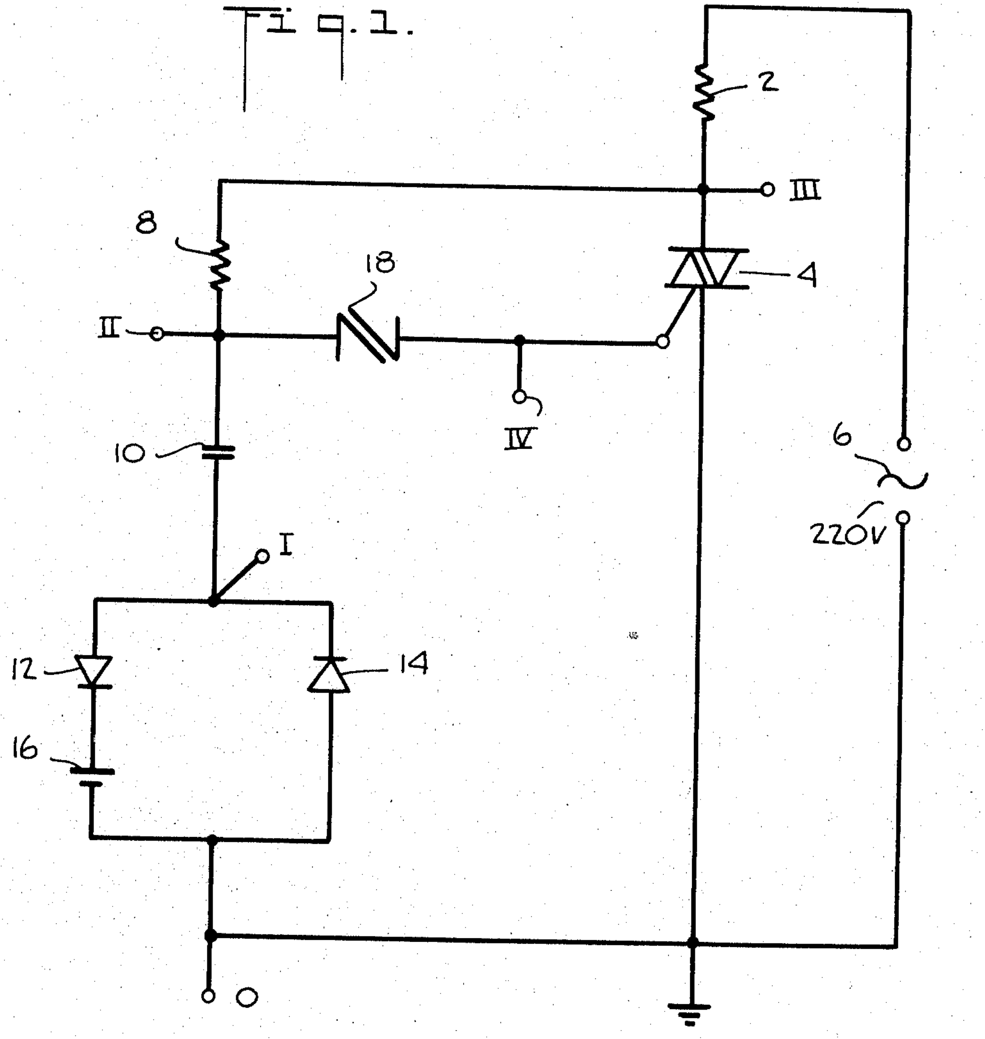
FIG. 1 is a schematic diagram illustrating one embodiment of the invention.

As shown in FIG. 1, a load element 2 is connected in series with the principal conducting electrodes of a triac 4 and an alternating current source 6. A second series circuit is provided by a resistor 8, a capacitor 10, and a diode 14 having a series connected combination of a diode 12 and a battery 16 connected in parallel therewith. This second series circuit is connected in parallel with the triac 4, and a trigger element 18 interconnects the control electrode of the triac 4 with the junction of the resistor 8 and capacitor 10.

Figures 2A, 2B, 2C, 2D, 2E:
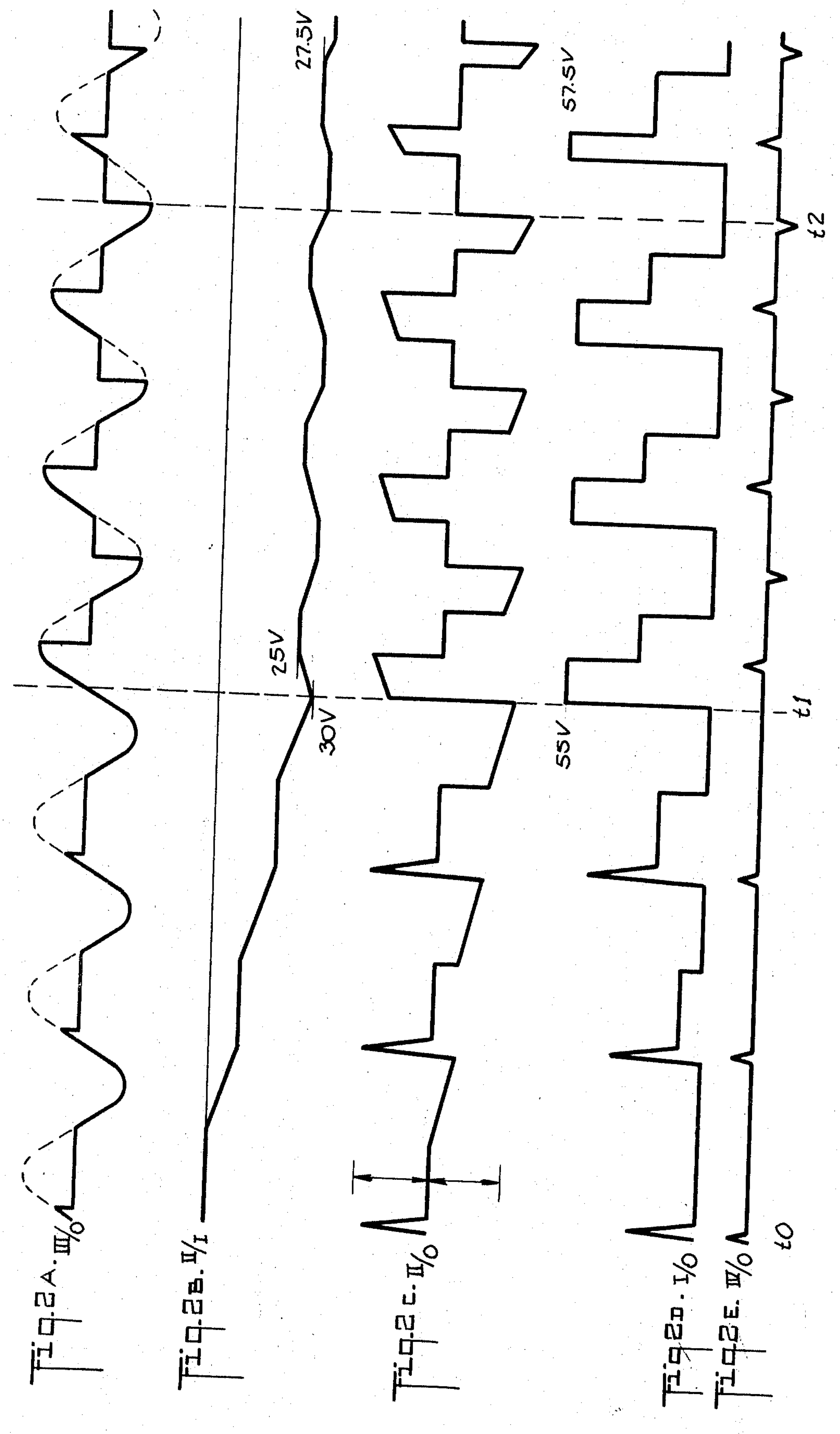
FIGS. 2a–2e show various wave-forms related to the circuit of FIG. 1.

FIGS. 2a–2e illustrate the waveforms at various points in the circuit of FIG. 1, and as shown by those waveforms the triac 4 begins to conduct symmetrical portions of the positive and negative voltage swings of the AC source 6 after a delay period defined by the time $t1 - t0$, where $t0$ is the assumed starting point of the AC current from the source 6. These waveforms can be obtained, for example, when the source 6 is a 220 volt supply, while the battery 16 is a 55 volt device, and the trigger element 18 conducts in response to a potential difference thereacross of 30 volts. Thus, the waveform across the triac 4, as measured from the point III to ground, is as shown in FIG. 2a, and such waveform results from the charging of the capacitor 10 as shown in FIG. 2b. In the operation of the circuit, during the first positive half-wave, the capacitor 10 is not subjected to a charging current due to the reverse bias of the diode 12 by the battery 16. During the first negative half-wave, however, the capacitor 10 through the diode 14 as illustrated in FIG. 2b, so that the waveform shown in FIG. 2c appears at the point II with respect to ground. After three negative half-waves of the supply signal, the capacitor 10 reaches a negative voltage of 30 volts, and as shown in FIG. 2c, the voltage at the point II then follows the rising supply voltage, and due to the subsequent discharge of the capacitor 10 through the diode 12, the trigger element 18 switches the triac 4 into conduction as the supply voltage reaches its maximum positive value. Thus, after the delay time $t1 - t0$ the triac 4 is caused to switch in a symmetrical manner to apply equal portions of the positive and negative half-waves to the load 2, as determined by the RC circuit provided by the resistor 8 and the capacitor 10, which RC circuit is arranged to charge and discharge an amount equal to five volts during each initial 90° portion of each half-wave.

As shown by the various waveforms an increased energization period for the load 2 is provided when the battery voltage is increased, whereby the triac 4 is caused to conduct during 3/4 of each half-wave when the battery voltage is increased to 57.5 volts, while the remaining parameters are held constant. That is, if at the time $t2$, as shown in FIG. 2*e*, the battery voltage is increased to 57.5 volts, then during the following positive half-wave the voltage between the point II and ground rises only to 27.5 volts before the bias voltage of the battery 16 is overcome so that the trigger device 18 can conduct. Thus, it is necessary for the capacitor to discharge for a time corresponding to only 2 ½ volts before the trigger element 18 is caused to conduct, wherefore the triac is rendered conductive during the latter ¾ of each half cycle of the supply voltage, and the symmetry of conduction is maintained.

Figure 3:
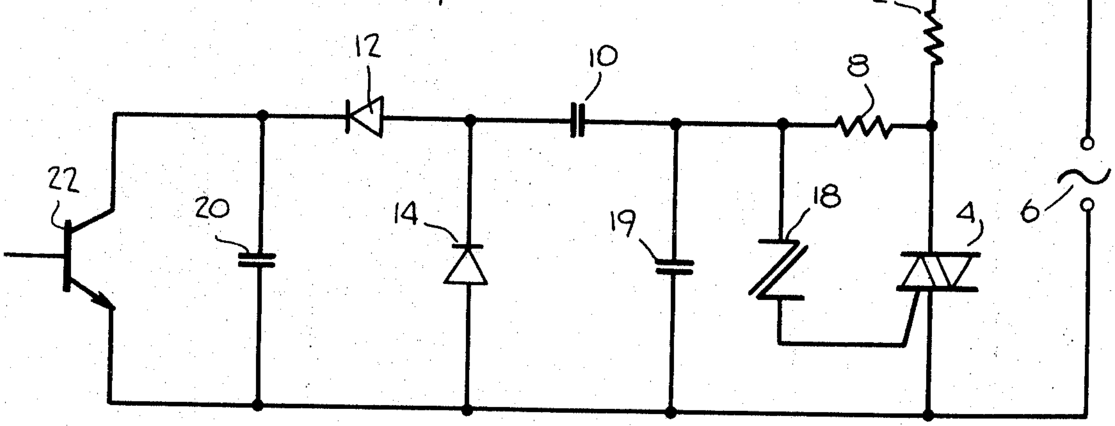
FIG. 3 shows a modification of the circuit illustrated in FIG. 1.

A modified embodiment of the invention is illustrated in FIG. 3 which shows a circuit having a construction similar to that of FIG. 1, wherein the battery 16 is replaced by a capacitor 20 having a charging-current source controlled by a transistor 22. Also, capacitor 19 is provided, in the circuit of FIG. 3, for the purpose of supplying the triggering current to the element 18. Thus, as in the circuit of FIG. 1, the biasing voltage for the diode 12 can be controlled by varying the charging current as controlled by the transistor 22. In other respects the operation of the circuit shown in FIG. 3 is identical to that of the circuit illustrated in FIG. 1.

Figure 4:
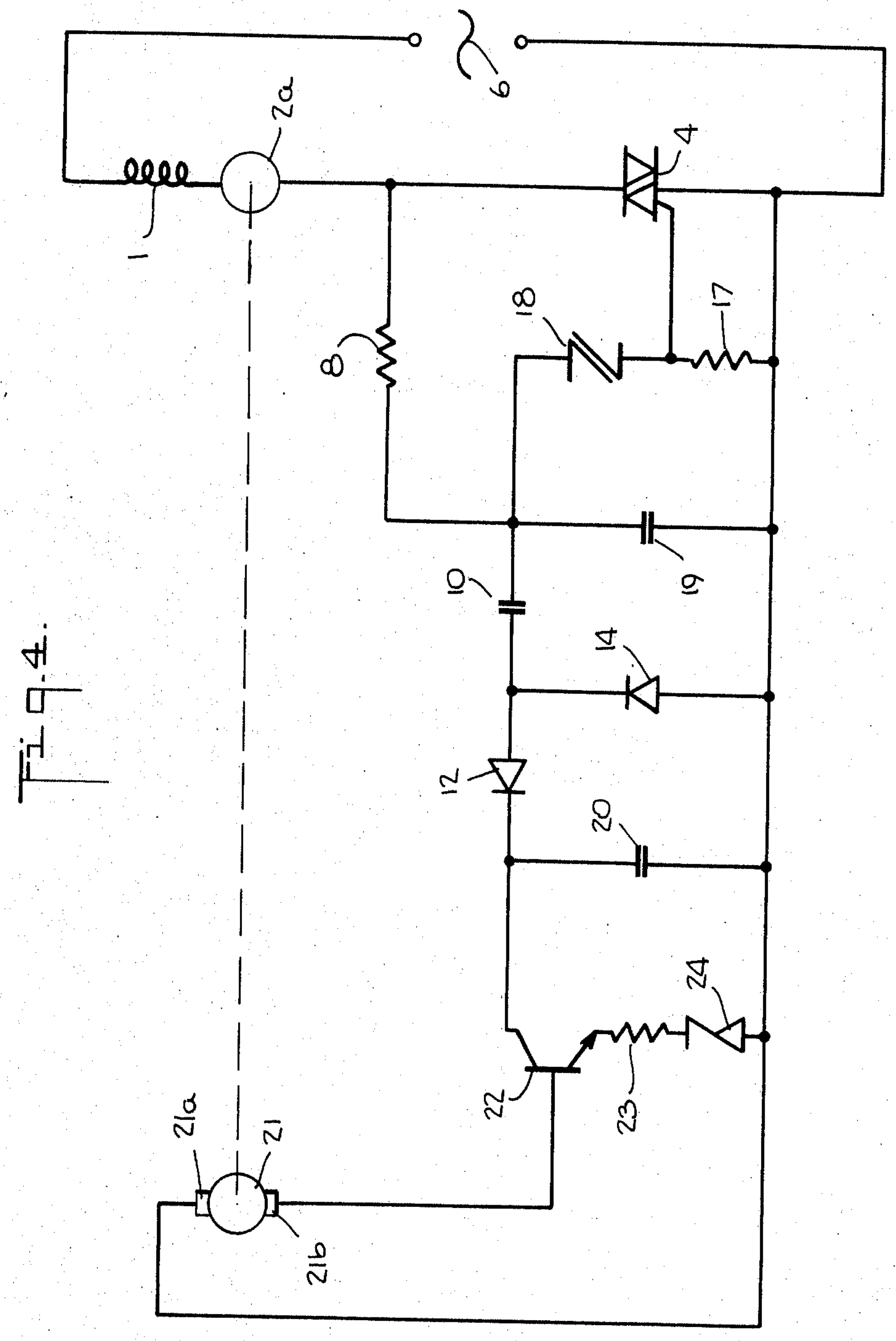
FIG. 4 shows a further modification of the circuit of FIG. 1 as applied to a motor control circuit.

In a specific application of the circuit, as illustrated in FIG. 4, the load comprises a motor 2*a* having an armature and a field winding 1. A tachometer generator 21, mechanically linked to the motor, has output leads 21*a* and 21*b* connected across the control circuit of the transistor 22, wherein a series combination of a resistor 23 and a Zener diode 24 is provided between the emitter of the transistor 22 and ground. Accordingly, a relatively simple and reliable speed control circuit is thus provided wherein the supply voltage applied to the motor 2*a* is directly correlated with the speed of that motor. In the operation of the circuit of FIG. 4, a closed control loop is provided wherein the speed of the motor 2*a* is detected by the tachometer 21 which provides an output signal proportional to such speed. The tachometer output signal is applied to the transistor 22 which controls the charging current for capacitor 20, and that capacitor provides a bias voltage thereby replacing the battery 16 used in the circuit of FIG. 1. The purpose of the Zener diode 24 is to provide limits for actuation of the control function of the charging current, while the operation of the remaining portions of the circuit are the same as in FIG. 1.

Figure 5:
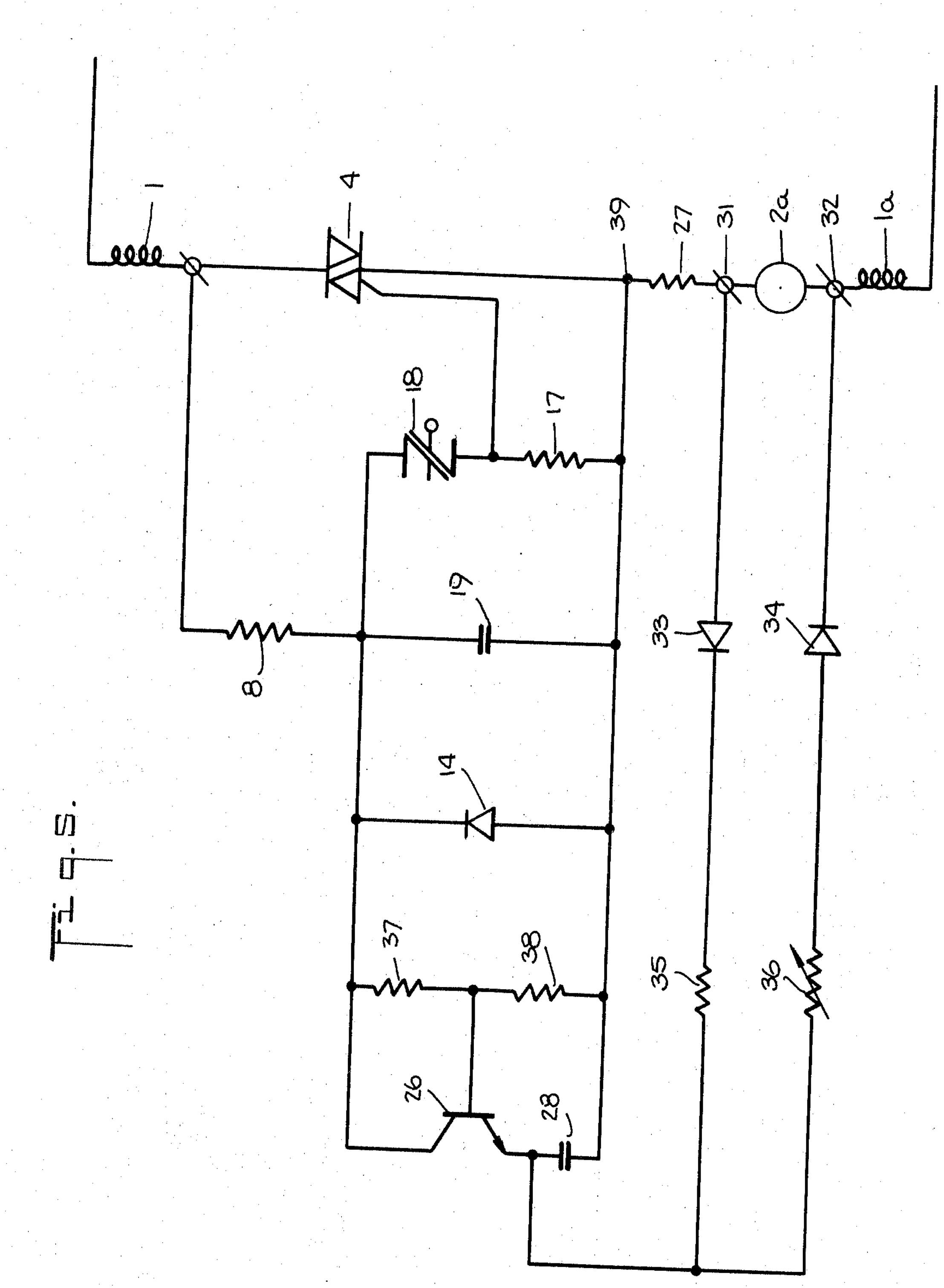
FIG. 5 shows a further modification of the circuit of FIG. 1, wherein that circuit is also applied to a motor control circuit.

A modification of the system illustrated in FIG. 4 is shown in FIG. 5, wherein the series motor 2*a* is provided with a pair of terminals 31 and 32 at the armature thereof, and wherein the voltage across the armature is sensed by a capacitor 28 having one electrode coupled to a reference point 39, and having its other electrode coupled to the junction of a pair of resistors 35 and 36, wherein the other ends of the resistors are coupled respectively through diodes 33 and 34 to the terminals 31 and 32. As shown, a resistor 27 is connected in series with the load between the reference point 39 and the terminal 31. Thus, with each reversal in potential across the armature 2*a* the capacitor 28 is caused to charge or discharge and each potential shift across the capacitor 28 is applied to the emitter of a transistor 26 which has its collector connected to the trigger element 18 and to one end of a voltage divider, provided by a pair of resistors 37 and 38, having its other end connected to the reference point 39, and having its junction connected to the base of the transistor 26. Since the base voltage of the transistor 26 is fixed by the voltage divider provided by the resistors 37 and 38, the capacitor 28 and transistor 26 provide an auxiliary voltage source responsive to the voltage across the motor 2*a*, whereby the capacitor 28 and the transistor 26 respectively replace the battery 16 and the diode 12 illustrated in FIG. 1.

Accordingly, it is seen that the present invention can be applied to control either the energy applied to a motor or the speed thereof.

What is claimed is:

1. In a circuit for controlling bi-directional current flow through a load, wherein the current is supplied by an AC source, the improvement comprising:

automatically controlled switching means having a control electrode, and having a pair of principal conducting electrodes for connection in series with a load and an AC source; and trigger circuit means having an input coupled to one of said principal conducting electrodes, and having an output coupled to said control electrode of said switching means for triggering said switching means between conducting and non-conducting states at equal intervals during both positive and negative phases of voltage supplied by said source, said trigger circuit further including a resistor and a first capacitor coupled toether to provide a timing circuit, first and second rectifying means coupled together in an opposed-polarity parallel relationship to control charging and discharging with said capacitor, biasing means including a second capacitor connected in series with one of said diodes and connected to one of said rectifying means to control its conduction point, current source means connected to said second capacitor for controlling the voltage thereacross to bias said one diode, and means connected to said trigger circuit means output for sensing the said charging and discharging of said first capacitor to produce trigger signals and to apply said trigger signals to said control electrode of said switching means.

2. A circuit as set forth in claim 1 in which said current source means includes a transistor connected in series combination with said second capacitor for controlling the charging current for said second capacitor.

3. A circuit as set forth in claim 2, in which said transistor has a control electrode, and further comprising an AC motor having an armature winding connected to said switching means to provide said load, a tachometer generator mechanically coupled to said motor and providing an output signal which varies with variation in speed of said motor, and means for applying said output signal of said tachometer generator to said control electrode of said transistor for controlling the conduction of said transistor.

4. A circuit as set forth in claim 2, in which said transistor has a control electrode, and in which said current source means further includes signal source means coupled to said transistor control electrode for controlling the conduction of said transistor, and a Zener diode connected in series with said transistor and second capacitor.

5. A circuit as set forth in claim 4, further comprising an AC motor having an armature winding connected to said switching means as said load, and in which said signal source means comprises a tachometer generator mechanically coupled to said motor and providing an output signal which varies with variation in speed of said motor, wherein said tachometer output is coupled to said transistor control electrode.

6. A circuit as set forth in claim 1 in which one of said rectifying means comprises a transistor having its emitter-collector circuit coupled in said opposed-polarity parallel relationship with the other said rectifying means.

7. A circuit as set forth in claim 6, in which said biasing means includes said capacitor connected in the emitter-base circuit of said transistor for controlling the conduction point of said transistor.

8. A circuit as set forth in claim 7, further comprising an AC motor having an armature winding connected to said switching means to provide said load, a resistor connected in series with said armature winding, and voltage sensing means connected between said capacitor and said armature winding for controlling the charging and discharging of said capacitor in response to voltage changes applied to said armature winding.

9. A circuit as claimed in claim 1 in which said rectifying means each comprise a diode.

* * * * *